Oct. 6, 1959  J. P. SCHAFER  2,907,964
GYROMAGNETIC POLARIZING DEVICE
Filed Sept. 22, 1955

INVENTOR
J. P. SCHAFER
BY Roy M. Porter Jr.
ATTORNEY

United States Patent Office 2,907,964
Patented Oct. 6, 1959

2,907,964

GYROMAGNETIC POLARIZING DEVICE

John P. Schafer, Elberon, N.J., assignor to Bell Telephone Laboratories, Incorporated, New York, N.Y., a corporation of New York Application September 22, 1955, Serial No. 535,987

8 Claims. (Cl. 333—98)

This invention relates to means for polarizing microwave components and more particularly to the use of magnetic devices for applying magnetic fields to mutually compensating ferrite elements uniformly effecting electromagnetic waves transmitted therethrough.

In a copending application Serial No. 535,986 filed September 22, 1955, of which I am joint inventor, it is disclosed that Faraday rotation of the plane of polarization of electromagnetic waves may be broad-banded by utilizing two mutually compensating ferrite elements. Each of the ferrites is subjected to a magnetic field of respectively opposite polarity to the other. The transmission characteristics of the ferrites are similar but differ in magnitude. With the ferrites oppositely polarized, therefore, a wave transmitted through both ferrites experiences a rotation of its plane of polarization equal to the algebraic sum of the rotations afforded by the individual ferrites. The effect is the subtraction of one ferrite characteristic from the other. The difference thus obtained is a net characteristic that is flat over a frequency range as great as that for which the characteristics of the individual ferrites are similar. As disclosed in the above-mentioned copending application, the two magnetic fields of opposing polarities were achieved by the use of two permanent magnets or two solenoids.

The two magnets, and also their respective ferrites, had to be physically separated by a distance sufficient to minimize interaction between the two magnets. This resulted in an increase in the overall length of the Faraday rotator.

It is an object of this invention to provide a magnetic field environment for a self-compensating microwave component comprising two magnetic domains longitudinally disposed one to the other and of respectively opposite polarity.

It is an additional object of this invention to apply to two elements of a Faraday rotator device, respectively oppositely polarized magnetic fields utilizing a single magnetic structure, whereby the elements may be disposed as close to each other as desired.

It has been recognized that a single hollow cylindrical permanent magnet has a magnetic field configuration which may be considered as comprising three separate regions or domains. In the cavity of a cylindrical magnet the lines of force flowing from one end of the cylinder to the other have a given sense and a direction which in the main is parallel to the longitudinal axis of the cylinder. External to the cavity along the extensions of the longitudinal axis of the cylinder are two additional regions containing a substantial proportion of lines of force that are also parallel to the axis. However, the sense of these external lines of force are opposite to the sense of the magnetic field internal to the cavity. As a consequence at either end of the cylinder two magnetic field domains exist in series opposition to each other and are distinguished from each other in that the domain internal to the cylinder cavity is of a given sense and the domain external thereto is of opposite sense. Consequently, by placing a first ferrite in the cavity of the magnet and a second ferrite in the region external to the magnet and along its longitudinal axis, the conditions required by the frequency compensating Faraday rotator are achieved. It has in addition been recognized that in the cavity the magnetic field drops from a maximum value very precipitously to zero upon reaching the end of the cylinder. Similarly, external to the cylinder at that end the magnetic field precipitously drops from a maximum value to zero upon approaching that point from the opposite direction. As a consequence the reversal of polarity at the end of the cylinder is very sharp and abrupt thereby defining very clearly the boundary of the regions into which the ferrites may be placed. The ferrites may therefore be placed as close to each other as desired, and may even be in contact with each other at the boundary.

These and other objects and features of the present invention, the nature of the invention and its advantages will appear more fully upon consideration of the various specific illustrative embodiments shown in the accompanying drawings and in the following detailed description. In the drawings.

Figure 1:
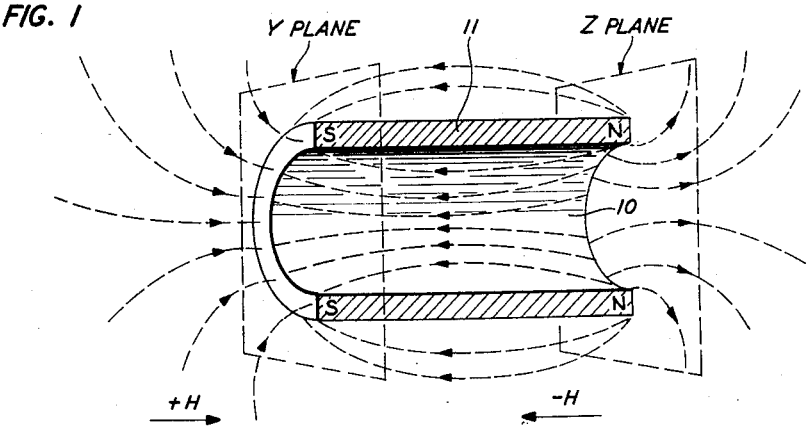
Fig. 1 is a diagrammatic representation given for the purpose of explanation of the magnetic field pattern of a cylindrical magnet.
Figure 2:
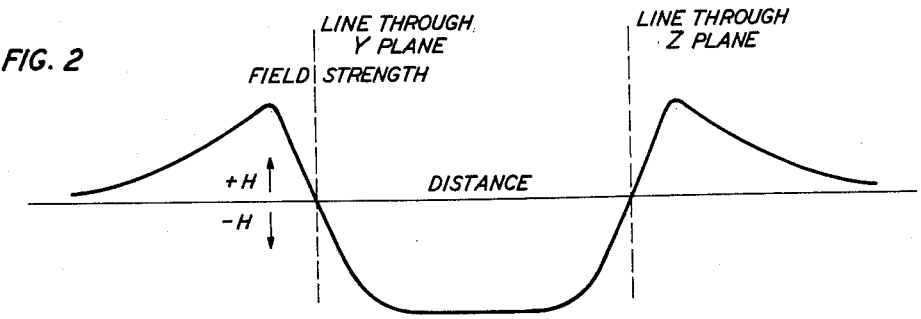
Fig. 2 is a graphical representation given for the purpose of explanation of the variation of magnetic field strength with distance along the longitudinal axis of the magnet of Fig. 1.

Referring more specifically to Fig. 1, a cross section view of a hollow permanent cylindrical magnet 11 together with its magnetic field pattern representation, which is employed in the invention, is presented by way of example for purposes of illustration. Hollow magnet 11 may be composed of magnetic material such as Alnico V, although it may be of any of the ferromagnetic materials exhibiting a permanent magnetic property. The magnet is polarized so that the north pole N is represented at the right-hand end of the magnet and the south pole S at the extreme left-hand. As a consequence, magnetic flux lines extend longitudinally through the hollow cavity portion 10 of the magnet in the sense from right to left. Plane Z passing through the right-hand edge of the cylinder perpendicular to its longitudinal axis (and thus the north pole side) represents the region where lines of force commence. Plane Y parallel to plane Z, passes through the left-hand edge of the cylinder (and therefore through the south pole region) representing the region where the lines of force commencing at the north pole terminate at the south pole. It may be seen that external to the cavity and to the left of plane Y, lines of force parallel to the longitudinal axis of the cylinder are directed towards the south pole and plane Y. It may be noted that the sense of these lines of force external to the magnet are opposite to these internal to cavity 10. Plane Y therefore is a magnetic null region and represents a plane of magnetic field polarity reversal. Referring now to Fig. 2 a graphical plot is presented of the above-described magnetic field pattern. The ordinate represents field strength. The abscissa represents distance along the longitudinal axis of the magnet with the origin at the Y plane. It can be seen that in the region from the Y to Z planes the magnitude of the field is relatively constant at its maximum value and only on approaching the Y and Z planes does the value drop off. Once the magnitude begins decreasing it does so very radically, that is, maximum strength exists until very close to the Y plane, and therefore to the end of cylinder 10, before it commences decreasing to zero. To the left of the Y plane the field strength once again builds up very rapidly but in a sense, of course, opposite to that in the Y to Z cavity region. Although maximum strength to the left of the Y region is somewhat less than the maximum to the right and although it is sustained over a short distance the maximum is nevertheless sufficient to saturate the ferrite element to be placed in that region. As a consequence it may be seen that to the left of the Y plane a south-to-north field (henceforth to be referred to as the positive field) exists reaching a strength substantially equivalent to that of the north-to-south field that exists to the right of the Y plane (henceforth to be referred to as the negative field). Clearly, two separate and distinct magnetic field domains are thereby defined.

Figure 3:
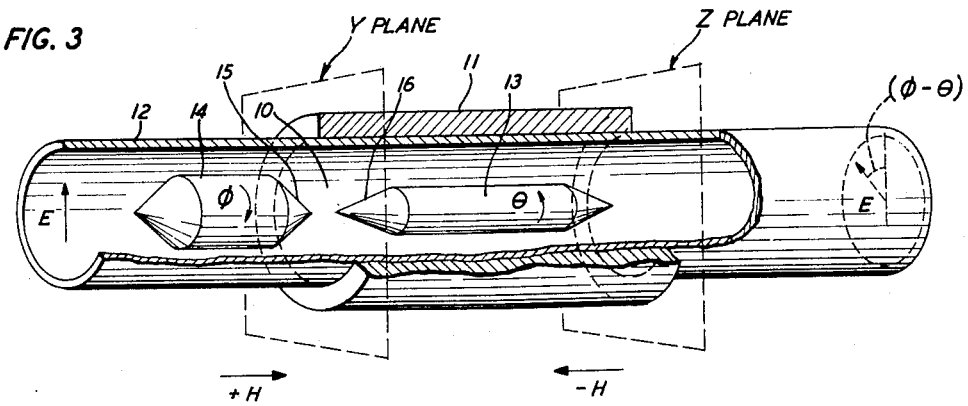
Fig. 3 is a perspective view of a broad-band electromagnetic wave polarization rotator utilizing the single magnet of Fig. 1 in accordance with the invention.

Referring now to Fig. 3 a broad-band Faraday rotator utilizing a single permanent magnet in accordance with the invention is represented for purposes of illustration. Passing through the hollow section 10 of magnet 11 is a hollow cylindrical wave guide 12 of the metallic sheath type whose external wall is concentric to the internal cylindrical wall of magnet 11. Magnet 11 has freedom of motion with respect to guide 12 in the direction parallel to their longitudinal axis. Planes Z and Y mentioned above with respect to Fig. 1 are in a similar way presented at the right and left-hand edges of magnet 11. Suitably supported within wave guide 12 within the cavity region 10 of magnet 11 and between its left and right-hand ends, Y and Z, is an elongated element 13 of gyromagnetic material that may specifically be composed of ferrite. Ferrite 13 is located along the longitudinal axis of guide 12. It may be seen, therefore, that ferrite 13 is located in the negative magnetic field domain discussed above. Also suitably supported within guide 12 but external to cavity 10 and to the left of plane Y is located a gyromagnetic element 14 that may also be specifically composed of ferrite. Ferrite 14 is wider in cross-sectional dimension, shorter in length and may be of smaller magnetic saturation than element 13. Ferrite 14 therefore resides entirely in the positive magnetic field domain discussed above. Each end of both ferrites 13 and 14 is provided with a right conical taper, in a manner well known in the art, to avoid abrupt impedance discontinuities. The respective ends 15 and 16 facing each other of ferrites 13 and 14 are separated from each other by a small interval. The ferrites are thereby entirely in their respective positive and negative magnetic field domains. Gyromagnetic elements 13 and 14 are of the type well known in the art that produce a rotation of the plane of polarization of electromagnetic waves transmitted through them when they are subject to an applied longitudinal magnetic field. Because of the different dimensions respectively of elements 13 and 14 the amount of rotation each produces is different. However, these dimensions are carefully chosen such that the frequency responses of both the ferrites over a given range of frequencies are similarly shaped. The precise manner for obtaining this type of match is discussed in detail in the copending application mentioned above.

In the operation of the embodiment of Fig. 3 a vertically linearly polarized electromagnetic wave E entering guide 12 from the left will be propagated through ferrite element 14. Since ferrite element 14 is subjected to the applied positive magnetic field of magnet 11, the plane of polarization of the wave will be rotated clockwise by some amount, $\varphi$. On proceeding past ferrite 14 the rotated wave enters ferrite 13 which thereupon proceeds to produce another rotation upon the wave of magnitude $\theta$ which is greater than $\varphi$. However, ferrite 13 is internal to magnet 11, residing entirely within its cavity 10 and therefore within the region of negative magnetic polarity. As a consequence the rotation produced by ferrite 13 will be in an opposite sense to that produced by ferrite 14, namely, counterclockwise. After exiting ferrite 13 the wave has experienced two rotations, the first in a clockwise sense by a magnitude $\varphi$ and a second in a counterclockwise sense by a magnitude $\theta$. Therefore, the net rotation produced upon the wave is equal to the magnitude of the rotation produced by ferrite 14 minus the magnitude of the rotation produced by ferrite 13, and in a counterclockwise sense.

In the above-mentioned copending application it is disclosed that one control available for adjusting the frequency response of two ferrites so as to obtain a flat algebraic-sum response is the electrical length of either or both ferrites. Varying the strength of the applied magnetic field varies the electrical length of the ferrite. One aspect of the present invention as represented by the embodiment of Fig. 3 provides a novel way of exercising this control. As mentioned above, magnet 11 is free to move relative to guide 12, and therefore to ferrites 13 and 14, in a direction parallel to their common longitudinal axis. By moving magnet 11 a given distance right or left relative to ferrites 13 and 14, the field of the magnet is of course translated right or left relative to the ferrites by that given distance. As a consequence more or less of the regions of maximum field strength to the left and right of the Y plane is applied respectively to ferrites 14 and 13. Moving the magnet is a means for controlling the strengths of the fields applied to the ferrites and is therefore a control over their frequency response characteristics. This feature is a flexible means available in the empirical matching of ferrite response characteristics and for making operating adjustments to compensate for changes in magnetic saturation due to temperature variations.

Figure 4:
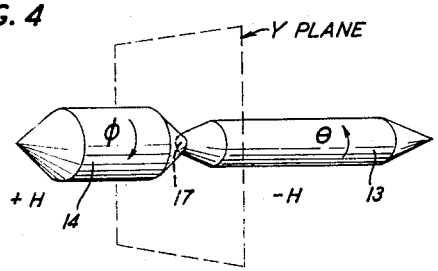
Fig. 4 is a perspective view of an alternative variation of the polarization rotator in Fig. 3 in accordance with the invention.

Referring now to Fig. 4, a variation of the embodiment of the invention of Fig. 3 is presented for purposes of illustration. Fig. 4 differs from Fig. 3 only in the spacing between the ferrite elements and therefore similar reference numerals are employed. It is often desirable to have microwave devices physically compact because of limitations of space available for installing equipment. This feature is emphasized in Fig. 4, in that ferrite elements 13 and 14 have no spacing between them. As mentioned above with respect to Figs. 1 and 2, plane Y very sharply defines the region of magnetic polarity reversal and thus the null region. In Fig. 4, one end of ferrite 13 is placed in direct contact with an end of ferrite 14, with the region of contact being in the Y plane. Thereby, the physical length of the Faraday rotator is decreased while the ferrites remain in their respective magnetic domains. The contiguous ends of the ferrites, rather than tapering to a point, are truncated. Thus they are in contact along a flat region 17 contained in plane Y. If desired, elements 13 and 14 may be replaced by a single ferrite otherwise conforming in all respects to the physical and chemical parameters of the two ferrites in contact with each other.

In all cases, it is understood that the above-described arrangements are simply illustrative of a small number of many possible specific embodiments which can represent applications of the principles of the invention. Numerous and varied other arrangements can readily be devised in accordance with said principles by those skilled in the art without departing from the spirit and scope of the invention.

What is claimed is:

1. In a microwave transmission system, a single hollow cylindrical permanent magnet, said magnet defining a magnetic field pattern comprising lines of force parallel to the longitudinal axis of said cylinder having a first polarity in the cavity of said cylinder and having a second polarity of opposite sense to said first polarity along the extensions of said longitudinal axis external to said cavity, a first means for supporting radio frequency wave energy comprising a first elongated ferrite element located in said cavity along said axis and subject longitudinally to said magnetic field in the region having said first polarity, and a second means for supporting radio frequency wave energy comprising a second elongated ferrite element located externally to said cavity along one of said extensions of said axis and longitudinally subject to said magnetic field wherein said second polarity prevails.

2. A broad-band Faraday rotator comprising a single hollow cylindrical permanent magnet, said magnet having a magnetic field pattern comprising lines of force parallel to the longitudinal axis of said cylinder having a first polarity in the cavity of said cylinder and having a second polarity of opposite sense to said first polarity along the extensions of said longitudinal axis external to said cavity, each end of said magnet thereby physically coinciding with a plane of magnetic polarity reversal, first means for supporting radio frequency wave energy comprising a first ferrite cylinder located within said cavity and subject to said lines of force having said first polarity, and second means for supporting radio frequency wave energy comprising a second ferrite cylinder located externally to said cavity subject to said lines of force having said second polarity.

3. A combination as recited in claim 2 wherein one end of said first ferrite cylinder is contiguous to one end of said second ferrite cylinder in the region of one end of said permanent magnet, whereby the transverse plane formed by said contiguous ends coincides with said plane of magnetic polarity reversal.

4. A combination as recited in claim 2 wherein the end of said first ferrite faces an end of said second ferrite and is displaced therefrom by an interval through which passes said plane of magnetic polarity reversal.

5. A combination as recited in claim 2 wherein said hollow magnet has freedom of motion relative to said ferrite cylinder in the direction parallel to said ferrites' longitudinal axis.

6. In a microwave transmission system, a single hollow elongated permanent magnet, said magnet defining a magnetic field pattern comprising lines of force parallel to the longitudinal axis of said magnet having a first polarity in the cavity of said magnet and having a second polarity of opposite sense to said first polarity along the extensions of said longitudinal axis external to said cavity, and means for supporting radio frequency wave energy comprising magnetically polarizable material exhibiting the gyromagnetic effect at the frequency of wave energy supported by said transmission system located in said magnetic field in the region having said first polarity and extending into said magnetic field in the region wherein said second polarity prevails.

7. A combination as recited in claim 6 wherein said hollow magnet is free to move relative to said magnetically polarizable material.

8. In a microwave transmission system, a single hollow elongated permanent magnet, said magnet defining a magnetic field pattern comprising lines of force parallel to the longitudinal axis of said magnet having a first polarity in the cavity of said magnet and having a second polarity of opposite sense to said first polarity along the extensions of said longitudinal axis external to said cavity, a first means for supporting radio frequency wave energy comprising a first magnetically polarizable element exhibiting the gyromagnetic effect at the frequency of wave energy supported by said transmission system located in said cavity and subject longitudinally to said magnetic field in the region having said first polarity, and a second means for supporting radio frequency wave energy comprising a second elongated magnetically polarizable element exhibiting the gyromagnetic effect at the frequency of said wave energy located externally to said cavity and longitudinally subject to said magnetic field wherein said second polarity prevails.

References Cited in the file of this patent

UNITED STATES PATENTS 2,748,353    Hogan _____ May 29, 1956

FOREIGN PATENTS 674,874    Great Britain _____ July 2, 1952

OTHER REFERENCES

Darrow: Bell System Technical Journal, vol. 32, Nos. 1 and 2, January and March 1953, pp. 74–99 and 384–405. (Copy in Scientific Library.)

Spectroscopy at Radio and Microwave Frequencies (D. J. E. Ingram), published by Butterworths Scientific Publications (London), 1955. (pages 205 and 215 relied on. Copy in Scientific Library).

Fox et al.: "Behavior and Applications of Ferrite," Bell Technical Journal, vol. 34, No. 1, January 1955, pages 5–104.